(12) United States Patent
Jeyapaal et al.

(10) Patent No.: US 12,728,792 B2
(45) Date of Patent: Sep. 8, 2026

(54) ELECTRIC VEHICLE

(71) Applicant: TVS MOTOR COMPANY LIMITED, Chennai (IN)

(72) Inventors: Bhaarath Rajagopal Jeyapaal, Chennai (IN); Vamsi Krishna Balla, Chennai (IN); Ganapathy Subramanian S, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 113 days.

(21) Appl. No.: 18/705,321

(22) PCT Filed: Jun. 21, 2022

(86) PCT No.: PCT/IN2022/050568
§ 371 (c)(1),
(2) Date: Apr. 26, 2024

(87) PCT Pub. No.: WO2023/073726
PCT Pub. Date: May 4, 2023

(65) Prior Publication Data

US 2025/0010791 A1 Jan. 9, 2025

(30) Foreign Application Priority Data

Oct. 27, 2021 (IN) ............................ 202141049087

(51) Int. Cl.

| | |
|---|---|
| ***B60Q 5/00*** | (2006.01) |
| ***B60L 50/60*** | (2019.01) |
| ***G10K 15/04*** | (2006.01) |
| ***H04R 1/02*** | (2006.01) |
| ***H04R 1/28*** | (2006.01) |
| ***H04R 1/40*** | (2006.01) |

(52) U.S. Cl.
CPC ............. *B60Q 5/008* (2013.01); *G10K 15/04* (2013.01); *H04R 1/025* (2013.01); *H04R 1/2896* (2013.01); *H04R 1/403* (2013.01); *B60L 50/66* (2019.02); *B60L 2270/42* (2013.01); *H04R 2499/13* (2013.01)

(58) Field of Classification Search
CPC .......... B60Q 5/008; B60Q 5/00; G10K 15/04; H04R 1/025; H04R 1/2896; H04R 1/403; H04R 2499/13; B60L 50/66; B60L 2270/42; B60L 2200/12; B60L 50/60; B62J 45/10; B62J 3/12; B62K 2202/00; B62K 2204/00
See application file for complete search history.

(56) References Cited

U.S. PATENT DOCUMENTS 8,156,401 B2 * 4/2012 King .................. G06F 11/1004 714/752
8,651,215 B2 * 2/2014 Ogura .................... B60L 50/66 180/65.6

(Continued)

*Primary Examiner* — Oyesola C Ojo
(74) *Attorney, Agent, or Firm* — Osha Bergman Watanabe & Burton LLP

(57) ABSTRACT

An electric vehicle includes: a main frame extending in a vehicle front-rear direction; and a sound generation device disposed at one or more locations at a front portion and/or a rear portion of the electric vehicle such that sound from the sound generation device is audible to pedestrians and riders of other vehicles thereby alerting movement of the electric vehicle.

12 Claims, 3 Drawing Sheets

(56) References Cited

U.S. PATENT DOCUMENTS 11,753,101 B2 * 9/2023 Buell .................... B62K 19/10 180/220
11,820,454 B2 * 11/2023 Fujikubo .................. B62J 11/16
2005/0113168 A1 * 5/2005 Maeda .................. G10K 15/02 463/35
2008/0094254 A1 * 4/2008 Hill ........................ G08G 1/005 340/944
2008/0128190 A1 * 6/2008 Tsutsumi .................. B62J 1/28 180/219
2009/0178870 A1 * 7/2009 Takahashi .................. B62J 3/04 296/192
2012/0081222 A1 * 4/2012 Tamaki .................. G10K 15/02 340/466
2012/0126969 A1 * 5/2012 Wilbur .................. B60Q 5/008 340/466
2012/0130580 A1 * 5/2012 Omote .................. G10K 15/02 701/22
2012/0182136 A1 * 7/2012 Nakayama ............. B60Q 5/008 340/425.5
2012/0298437 A1 * 11/2012 Dietz ...................... B64C 17/06 74/5.22
2012/0299717 A1 * 11/2012 Yoshino .................. B60Q 9/00 340/466
2012/0312609 A1 * 12/2012 Takewaka ................ B62J 17/02 116/28 R
2013/0182864 A1 * 7/2013 Takahashi ................ H03G 5/00 381/61
2014/0015656 A1 * 1/2014 Shimizu ................. B60Q 5/008 340/425.5
2014/0121864 A1 * 5/2014 Nakatani .................. G10K 9/13 701/22
2019/0158970 A1 * 5/2019 Konno .................... H03F 3/181
2020/0238902 A1 * 7/2020 Pyzik ..................... B60Q 5/008
2020/0398918 A1 * 12/2020 Buell ....................... B62J 45/10
2021/0107491 A1 * 4/2021 Atsushi .................. B62K 11/00
2021/0232358 A1 * 7/2021 Bethurum ................ H04R 1/22
2021/0380137 A1 * 12/2021 Domeyer ............... G06V 20/56

* cited by examiner

ELECTRIC VEHICLE

FIELD OF THE INVENTION

The present invention generally relates to an electric vehicle. More particularly relates to a sound generation device for the electric vehicle.

BACKGROUND OF THE INVENTION

Due to rising fuel cost and increased environmental concerns, use of alternate energy source for transport has always been a sustainable option. Technologies have been in the constant process of finding one or more alternative solutions to the fossil fuel, and with advancements in technology, electric and hybrid vehicles have been a point of attraction for many customers. The electric vehicles are typically run by a motor which receives a power from a power source like a battery. In case of hybrid electric vehicles, power is drawn from an internal combustion engine as well as the battery, depending upon the requirements of a rider of the vehicle.

In case of a pure electric vehicle, it runs only on the battery power source through the motor. As there is no internal combustion engine in the electric vehicles, the electric vehicles are a lot quieter than the gas-powered counterparts since the internal combustion engine makes noise during the operation. As the electric vehicles are quieter, the other vehicles travelling on roads or a person walking on the road or on a pedestrian or a cyclist may not be aware of the electric vehicle approaching to their sides on the road. This may cause a fatal accident in case the approach of electric vehicle is unnoticed. The lack of noise in the electric vehicles pose a further danger to other road users, especially people who are differently abled.

In the existing two-wheeled electric vehicles, there is no mechanism that can create recognizable sounds other than horns to make people aware of the movement of the electric vehicle. When the driver of the two-wheeled electric vehicle is not using the horn, even then the drivers of the other vehicles and pedestrians need to have a feel of the electric vehicle in their vicinity, from the sound of the electric vehicle, which is not present in the existing two-wheeled electric vehicles.

In many countries, there exists a mandate by the government to have a warning sound in all type of the electric vehicles so that the passer-by is aware of the electric vehicle being in their vicinity. The warning sounds may be driver triggered such as a horn or automatic triggered horns at low speeds. However, the sound may vary from clearly artificial like beeps or chimes to those that mimic the engine sounds and those of tires moving over gravel. In order to overcome this problem, many automakers involved in passenger car manufacturing have attempted to use a Virtual Engine Sound System (VESS) to solve such a problem. In this kind of method, a speaker under the bonnet of the vehicle is installed to produce an artificial sound that alerts people when the vehicle is moving. However, the placement of speaker under the bonnet was not effective to communicate the sound generated during the movement of the passenger car vehicles.

Further, in case of two-wheeled electric vehicles, the vehicle design being a compact, adding another component to the existing layout with the problem of space constraint can be a complex and challenging task. In addition, the location of the component to be placed, should be such that it can easily be audible to riders of other vehicles, people walking on the pedestrian or people crossing the road, and to the rider himself but not too loud to startle the rider itself.

Due to very low noise of the electric vehicle, it was often reported about road accidents and thus, raising a concern about the safety of the people on pedestrian and the blind people. The existing electric vehicles do not have a provision which can create a sound for alerting the people or nearby riders of other vehicles about movement of the electric vehicle except the rider operated horn.

In order to overcome the aforementioned limitations, one or more attempts have been made in the electric two-wheeled vehicle. In one kind of existing electric vehicle, status information was not communicated to a rider of the vehicle on activating a mode or selecting a feature or in any other operating condition. To overcome this problem, a sound unit which can be capable of generating and outputting a status information on an operating condition of the vehicle is provided. However, the said attempt involves placement of a sound unit in an instrument cluster of the vehicle. The problem with the placement of the sound unit is that it makes the instrument cluster bulkier and difficult to operate a handlebar of the vehicle. This also affects overall balancing of the vehicle. In addition, the sound emitting from the sound unit will be loud enough for the rider of the vehicle but not for the other vehicles and the people on the pedestrian to listen it. Thus, the placement of the sound unit at the instrument cluster does not solve the problem.

In another attempt, a speaker is placed at the engine bay to produce a sound in the electric vehicle so that other vehicle riders and the people on the roads are aware of movement of the electric vehicle in their vicinity. However, since the speaker is placed in the engine bay, the sound produced by the speaker is not effectively communicated to outside the vehicle.

In yet another similar attempt, a speaker is placed under the bonnet to produce an artificial sound that alerts people when the car is moving, which is a Virtual Engine Sound System (VESS) to solve such a problem. But placing the speaker under the bonnet tend to block the sound and the sound may bounce off the bonnet, producing a different sound than intended by the manufacturer. Thus, the location for the speaker under the bonnet is not a feasible solution.

Thus, there is a need in the art for an electric vehicle with a sound generation device which could address at least the aforementioned problems and limitations.

SUMMARY OF THE INVENTION

In one aspect, the present invention is directed to an electric vehicle. The electric vehicle includes a main frame extending in a vehicle front-rear direction. The electric vehicle further includes a sound generation device disposed at one or more locations at a front portion and/or a rear portion of the electric vehicle such that a sound from the sound generation device is audible to pedestrians and riders of other vehicles thereby alerting movement of the electric vehicle.

In an embodiment, the sound generation device is disposed at the one or more locations on the vehicle and is attached with a part of the vehicle. The part is disposed on an outermost side of the vehicle.

In a further embodiment, the part disposed on the outermost side of the vehicle is in direct contact with atmosphere, such that the sound generated by the sound generation device has minimum resistance, thereby travels uninterrupted through one or more parts of the electric vehicle, one or more riders of the electric vehicle and luggage being carried on the electric vehicle.

In a further embodiment, the part of the vehicle attached with the sound generation device is configured to protect the sound generation device from damage due to an exposure to atmosphere.

In a further embodiment, the front portion of the electric vehicle for mounting one or more sound generation device includes parts of a floorboard member, an instrument cluster, a front panel, a front of a cover handle, such that the sound is audible in all directions surrounding the front portion of the electric vehicle alerting movement of the electric vehicle to the passing-by pedestrians and riders of other vehicles.

In a further embodiment, the sound generation device is disposed in a vehicle width direction at the floorboard member and is located behind a downtube extending in downward direction from a headtube.

In a further embodiment, the sound generation device is disposed onto the main frame in proximity of any of the part of the electric vehicle through one or more brackets connected with rubber dampers and one or more fasteners.

In a further embodiment, the sound generation device is disposed onto the main frame in proximity of any of the part of the electric vehicle disposed on the outermost side of the electric vehicle, such that the part is in direct contact with the atmosphere such that sound generated by the sound generation device has minimum resistance, thereby travels uninterrupted through one or more parts of the electric vehicle, one or more riders of the electric vehicle and luggage being carried on the electric vehicle.

In a further embodiment, the rear portion of the electric vehicle for mounting the one or more sound generation device includes the parts of a right side panel, a left side panel, a tail lamp cover, a rear panel and a rear fender of the electric vehicle.

In a further embodiment, the sound generation device is disposed above the rear fender and behind a battery box of the vehicle.

In a further embodiment, the sound generation device is disposed behind the rear panel and ahead of the battery box. The rear panel is extended between the seat assembly and the floorboard member.

In a further embodiment, the sound generation device is adapted to generate the sound, which is substantially identical to one or more of engine sounds, tyre movement sounds, vehicle running sounds, and the like thereby alerting to the passing-by pedestrians and the riders of other vehicles.

In a further embodiment, the sound generation device is adapted to generate the sound continuously during vehicle ON condition.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

Various features and embodiments of the present invention here will be discernible from the following further description thereof, set out hereunder. In the ensuing exemplary embodiments, the vehicle is a two-wheeled electric vehicle. However, it is contemplated that the disclosure in the present invention may be applied to any automobile capable of accommodating the present subject matter without defeating the scope of the present invention.

The present invention generally relates to an electric vehicle. More particularly relates to a sound generation device for the electric vehicle.

Figure 1:
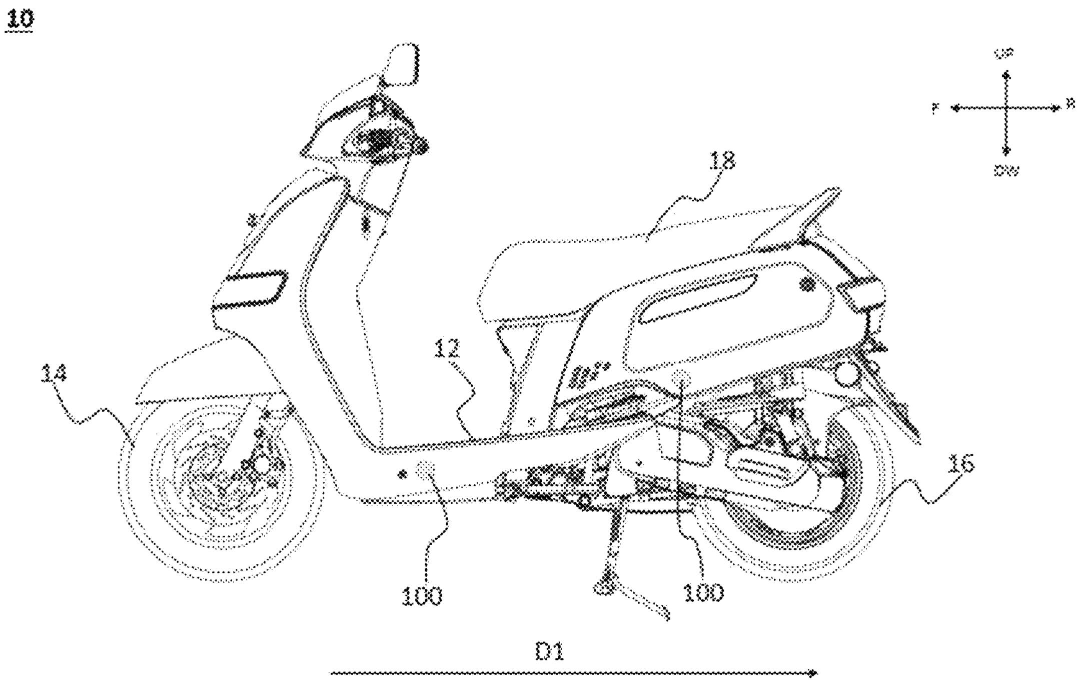
FIG. 1 illustrates a side view of an exemplary electric vehicle having at least one sound generation device, in accordance with an embodiment of the present invention.

FIG. 1 illustrates a side view of an exemplary electric vehicle having at least one sound generation device, in accordance with an embodiment of the present invention.

Figure 2:
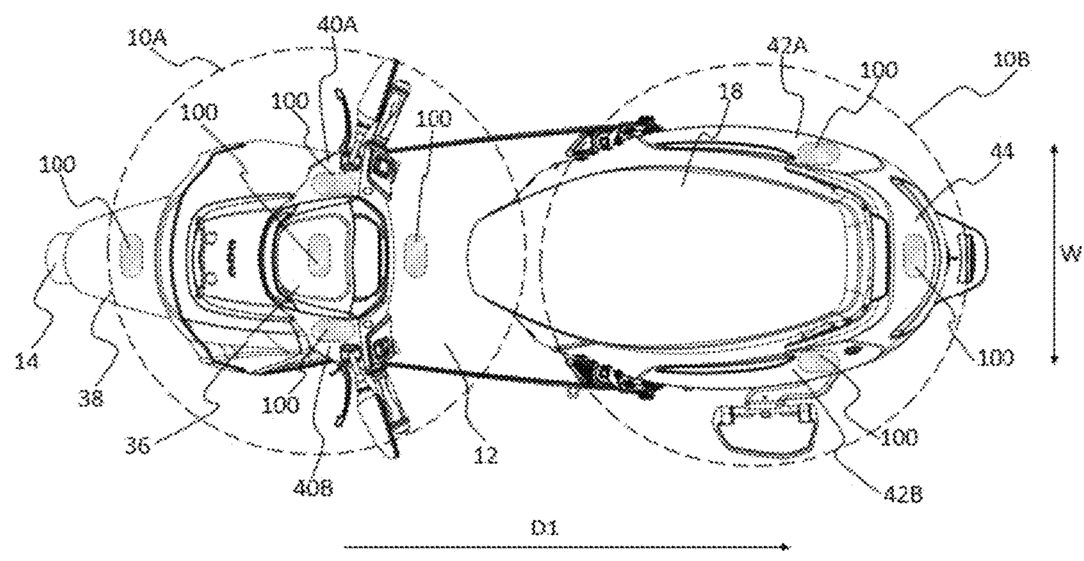
FIG. 2 illustrates a top view of the exemplary electric vehicle having the sound generation device at one or more locations in the vehicle, in accordance with an embodiment of the present invention.
Figure 3:
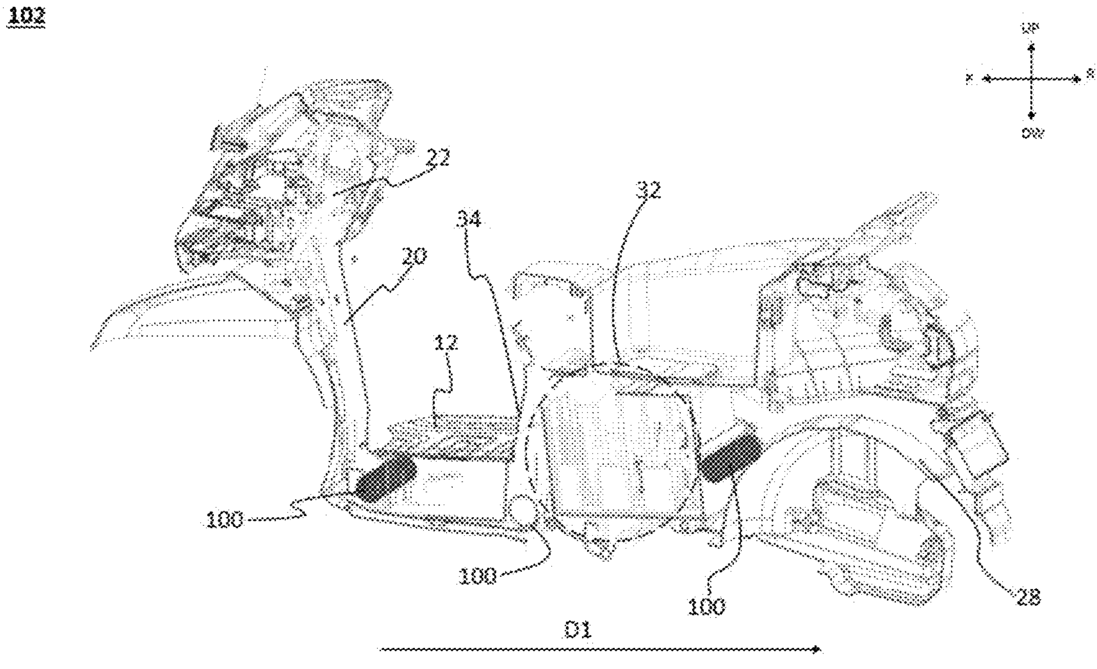
FIG. 3 shows a side view of a frame of the exemplary electric vehicle having the sound generation device at one or more locations in the vehicle, in accordance with an embodiment of the present invention.

As illustrated in FIGS. 1-3, the electric vehicle 10 is a scooter type two-wheeled vehicle in the illustrated embodiments. It may be contemplated that the electric vehicle can be any other kind of two-wheeled vehicle or three-wheeled vehicle. Thus, the illustrated examples of two-wheeled scooter vehicle should not be meant limiting the scope of the present invention. The terms "electric vehicle" and "vehicle" are interchangeably used in this disclosure. However, both the terms "electric vehicle" and "vehicle" are one and the same, and the term "vehicle" is used for brevity.

As illustrated in FIG. 1 and FIG. 2, the electric vehicle 10 includes a main frame 102 (shown in FIG. 3) extending in a vehicle front-rear direction "D1". In an embodiment, the main frame 102 includes a headtube 22 (shown in FIG. 3) at a front portion 10A (shown in FIG. 2) of the vehicle 10 for supporting components at the front of the vehicle 10. The main frame 102 provides a structural support to different vehicular components of the vehicle 10 and is adapted to mount one or more vehicular components of the vehicle 10, including, but not limited to, an instrument cluster 36 (shown in FIG. 2), a front panel 38 (shown in FIG. 2), cover handle 40A, 40B, a right side panel 42A, a left side panel 42B, a tail lamp cover 44, a seat assembly 18, a battery box 32 (shown in FIG. 3) with a battery (not shown). The vehicle 10 further includes a front wheel 14 and a rear wheel 16 driven by an electric motor (not shown). The electric motor receives a traction power from one or more power sources like the battery (not shown) for movement of the vehicle 10. As there is no internal combustion engine in the electric vehicle 10, the electric vehicle 10 is quieter than the vehicles which are operated by the power generated by the internal combustion engines.

Referring further to FIG. 1, the vehicle 10 includes a sound generation device 100 disposed at one or more locations at the front portion 10A and/or a rear portion 10B (shown in FIG. 2) in the vehicle 10. The sound generation device 100 is configured to generate a sound of predetermined intensity such that the sound is audible to passing-by pedestrians and riders of other vehicles and thus becomes an indicator indicative of movement of the vehicle 10 alerting to the passing-by pedestrians and riders of other vehicles about the movement of the electric vehicle 10. The term 'passing-by pedestrian' may include people moving across a road. The passing-by pedestrian may include impaired people or differently abled as well.

In an embodiment, the sound generation device 100 can be a speaker connected to the battery of the vehicle 10 and can be adapted to generate a sound substantially similar to a sound of an internal combustion engine. That is to say, the sound generation device 100 is adapted to generate sound, which is substantially identical to engine sounds, tyre movement sounds, and vehicle running sounds, thereby alerting to the passing-by pedestrians and the riders of other vehicles. In an embodiment, the sound generation device 100 is adapted to generate the sound continuously during vehicle ON condition. That is to say, the sound is produced continuously for the entire operation of the vehicle 10.

As illustrated in FIGS. 1-3, the sound generation device 100 disposed at one or more locations on the vehicle 10 is attached with a part of the vehicle 10. The part is disposed on an outermost side of the vehicle 10. In an embodiment, the part disposed on the outermost side of the vehicle 10 is in direct contact with atmosphere, such that the sound generated by the sound generation device 100 has minimum resistance, thereby enabling an uninterrupted sound travel through one or more parts of the electric vehicle 10, one or more riders of the electric vehicle 10 and luggage carried on the electric vehicle 10. In an embodiment, the part of the vehicle 10 attached with the sound generation device 100 is configured to protect the sound generation device 100 from damage by moisture and/or dust particles due to exposure to the atmosphere.

In an embodiment of the present invention, the sound generation device 100 may be in a cylindrical shape which allow easy mounting on the vehicle 10 at multiple places and the sound generated is not affected by the placement in the vehicle 10. In another embodiment, the shape of the sound generation device 100 can be varied based on mounting location and space availability.

In an embodiment of present invention as shown in FIGS. 1-3, the front portion 10A of the electric vehicle 10 for mounting one or more sound generation device 100 includes the parts, but not limited to, a floorboard member 12, an instrument cluster 36, a front panel 38, a front of a cover handle 40A, 40B. The one or more sound generation device 100 is attached with the parts such that the sound is audible in all directions surrounding the front portion 10A of the electric vehicle 10 alerting movement of the electric vehicle 10 to the passing-by pedestrians and riders of other vehicles. The sound generation device 100 attached with the parts of the front panel 38, the instrument cluster 36 and the front of the cover handle 40A, 40B provides a louder sound for the pedestrians and other vehicles in front of the vehicle 10.

As shown in FIG. 1, the sound generation device 100 is disposed at a front portion of the floorboard member 12 of the vehicle 10. Thereby, the sound is audible in all directions surrounding the vehicle 10 alerting movement of vehicle 10 to the passing-by pedestrians and riders of other vehicles. In particular, the sound generation device 100 is disposed in a vehicle width direction "W" (shown in FIG. 2) at the floorboard member 12 and is located behind a downtube 20 (shown in FIG. 3) extending in downward direction from the headtube 22. In other words, in this embodiment, the cylindrical sound generation device 100 is placed in a lateral direction below the floorboard member 12. The sound generation device 100 placed in the floorboard member 12 has an advantage of providing equal and appropriate sound for the rider, pedestrians and rider of other vehicles around with equal intensity of sound in all directions.

The sound generation device 100 is disposed onto the main frame 102 in proximity of any of the part of the electric vehicle 10 through one or more brackets (not shown) connected with rubber dampers (not shown) and one or more fasteners (not shown) like nuts and bolts. The sound generation device 100 is disposed onto the main frame 102 in proximity of any of the part of the electric vehicle 10. The part is disposed on the outermost side of the electric vehicle 10, such that the part is in direct contact with atmosphere such that sound generated by the sound generation device has minimum resistance. Thereby the sound travels uninterrupted through one or more parts of the electric vehicle 10, one or more riders of the electric vehicle 10 and luggage being carried on the electric vehicle 10.

In an embodiment, the rear portion 10B of the electric vehicle 10 for mounting the one or more sound generation devices 100 includes the parts of a right side panel 42A, a left side panel 42B, a tail lamp cover 44, a rear panel 34, and a rear fender 28 of the electric vehicle 10. As illustrated in FIG. 3, in one exemplary embodiment, the sound generation device 100 is disposed above the rear fender 28 and behind a battery box 32 of the vehicle 10. The sound generation device 100 can be placed in any orientation in a space between the rear fender 28 and the battery box 32.

The sound generation device 100 attached with the right side panel 42A and the left side panel 42B provides a louder sound for the rider, pedestrians and other vehicles at the sides of the vehicle 10, and the sound generation device 100 attached with the tail lamp/tail lamp cover 44 provides a louder sound for the rider, pedestrians and other vehicles at back/rear of the vehicle 10.

In another exemplary embodiment as shown in FIG. 3, the sound generation device 100 is disposed behind the rear panel 34 and ahead of the battery box/case 32. The rear panel 34 is a panel of the vehicle 10 which is extended between the seat assembly 18 and the floorboard member 12. The sound generation device 100 placed around the battery box 32 also has similar advantage of giving equal and appropriate sound for the rider, pedestrians and riders of other vehicles around with equal intensity of sound in all directions.

In an embodiment, the sound generation device 100 in the present invention can be one of a horn or a high frequency speaker like tweeters, low frequency speakers, like bass, a woofers or sub-woofers, and the like. In an embodiment of the present invention, an auditory distance perception can be in the range of 7-20 meters and a strength of the sound being produced by the sound generation device 100 can be greater than 60 db.

The sound generation device 100 in the present invention are of automotive grade. Hence, it is environmental proof and also vibration proof. Also, the sound generation device 100 can either be exposed to the environment or covered by side panels. In the case of the sound generation device 100 is covered by the side panels, gratings or vents are provided to ensure that the sound is not blocked or bounced back but reaches the pedestrians and riders of other vehicles. Also, since the sound generation device 100 is of automotive grade, the sound generation device 100 will not have any kind of magnetic or signal interference by other electronic components in the vehicle.

In another exemplary embodiment, the vehicle 10 may include a buzzer (not shown) for a phone call notification to a rider of the vehicle 10. The buzzer can be a part of an MP3 player of the vehicle 10. The buzzer acts at an audible level lower than normal audio level for not disturbing others on the vehicle or surrounding the vehicle, in an open vehicle environment. A Bluetooth paired MP3 player in the vehicle plays the audio through the sound generation device 100 about the phone calls to a small buzzer in MP3 device itself, exclusively for calls notifications. The audible level of the buzzer is maintained at an adequate level for the driver alone to listen, so that other people surrounding the vehicle is not disturbed by the sound. In an embodiment, the buzzer is configured to generate a continuous or beep sound.

Advantageously, the sound generation device as disclosed in the present invention is a speaker which generates a sound and communicates the sound effectively to make the other riders, people on pedestrian and blind people aware of movement of the electric vehicle passing-by, and thus avoids accidents. The location for attachment of the sound generation device(s) with the parts of the vehicle is such that the part is disposed on an outermost side of the vehicle and the sound generated by the sound generation device has minimum resistance, thereby travels uninterrupted through one or more parts of the electric vehicle, one or more riders of the electric vehicle and luggage being carried on the electric vehicle. Thus, the sound can be easily audible to other riders, people walking on the pedestrian or people crossing the road and the sound generated is not too loud for the rider himself/herself. Therefore, the sound generation device in the vehicle does not create noise pollution.

The present invention avoids fatal accidents during the movement of the electric vehicle to the pedestrians and the riders of other vehicles since the sound generation device generates a sound equivalent to an engine sound of the internal combustion engine continuously. Thus, the pedestrians and riders of other vehicles will be aware of the presence or approach of electric vehicle around them and thus avoiding the fatal accidents.

In the present invention, the location of the sound generation device or loudspeakers are safe and is optimum to ensure that the maximum sound reaches to the pedestrians and the riders of other vehicles without being too loud. Thus, the sound generation device in the electric vehicle does not have any panic sound creation or noise pollution. As the sound generation device is provided to the two-wheeled vehicle in a compact manner by using the dead space in the vehicle, space utilization in the electric vehicle is optimally carried out without increasing the overall cost of the vehicle. Also, since the sound generation device(s) are installed at optimum location(s) with the parts of the vehicle for alerting the pedestrians or any other vehicles around the electric vehicle passing nearby, the sound generated is optimally distributed around the electric vehicle.

Present invention overcomes the space constraint of compact design in the existing two-wheeled vehicle. This is obtained by locating the sound generation device in the existing layout, while ensuring the safety of the sound generation device and also ensuring that the sound is reached properly to the other people located in the vicinity of the vehicle on the road.

Further, the sound generation devices are protected from damage due to exposure to the atmosphere since the sound generation devices are attached to the parts of the vehicle which are configured to protect the sound generation device.

While the present invention has been described with respect to certain embodiments, it will be apparent to those skilled in the art that various changes and modification may be made without departing from the scope of the invention as defined in the following claims.

We claim:

1. An electric vehicle comprising:

a main frame extending in a vehicle front-rear direction; and sound generation devices disposed at a front portion and/or a rear portion of the electric vehicle, wherein the sound generation devices output sound audible to pedestrians and riders of other vehicles the sound generation devices are attached to different parts of the electric vehicle, wherein the parts of the electric vehicle are disposed on an outer side of the electric vehicle to be in direct contact with atmosphere, and at least one of the sound generation devices is covered by a side panel including gratings or vents that allow the sound to propagate through the side panel.

2. The electric vehicle as claimed in claim 1, wherein the parts of the electric vehicle are in direct contact with atmosphere, such that the sound generated by the sound generation devices has minimum resistance, thereby travels uninterrupted through one or more of the parts of the electric vehicle, one or more riders of the electric vehicle and luggage being carried on the electric vehicle.

3. The electric vehicle as claimed in claim 1, wherein the parts of the electric vehicle attached to the sound generation devices are configured to protect the sound generation devices from damage due to an exposure to atmosphere.

4. The electric vehicle as claimed in claim 1, wherein the front portion of the electric vehicle for mounting one or more of the sound generation devices comprises parts of a floorboard member, an instrument cluster, a front panel, a front of a cover handle, such that the sound is audible in all directions surrounding the front portion of the electric vehicle alerting movement of the electric vehicle to passing-by pedestrians and riders of other vehicles.

5. The electric vehicle as claimed in claim 4, wherein at least one of the sound generation devices is disposed in a vehicle width direction at the floorboard member and is located behind a downtube extending in downward direction from a headtube.

6. The electric vehicle as claimed in claim 1, wherein at least one of the sound generation devices is disposed onto the main frame in proximity of any of the parts of the electric vehicle through one or more brackets connected with rubber dampers and one or more fasteners.

7. The electric vehicle as claimed in claim 6, wherein at least one of the sound generation devices is disposed onto the main frame in proximity of any of the parts of the electric vehicle disposed on the outer side of the electric vehicle, such that the parts of the electric vehicle are in direct contact with the atmosphere such that sound generated by the sound generation devices has minimum resistance, thereby travels uninterrupted through one or more of the parts of the electric vehicle, one or more riders of the electric vehicle and luggage being carried on the electric vehicle.

8. The electric vehicle as claimed in claim 1, wherein the rear portion of the electric vehicle for mounting the sound generation devices comprises parts of a right side panel, a left side panel, a tail lamp cover, a rear panel and a rear fender of the electric vehicle.

9. The electric vehicle as claimed in claim 8, wherein at least one of the sound generation devices is disposed above the rear fender and behind a battery box of the electric vehicle.

10. The electric vehicle as claimed in claim 8, wherein at least one of the sound generation devices is disposed behind the rear panel and ahead of a battery box, the rear panel being extended between a seat assembly and a floorboard member.

11. The electric vehicle as claimed in claim 1, wherein the sound generation devices are adapted to generate sound, which is substantially identical to one or more of engine sounds, tyre movement sounds and vehicle running sounds, thereby alerting to passing-by pedestrians and the riders of other vehicles.

12. The electric vehicle as claimed in claim 1, wherein the sound generation devices are adapted to generate sound continuously during vehicle ON condition.

* * * * *